(12) United States Patent
Pascual et al.

(10) Patent No.: US 12,513,506 B2
(45) Date of Patent: Dec. 30, 2025

(54) METHODS AND SYSTEMS FOR SERVICE AUTHORIZATION FOR A PRODUCT-RELATED SERVICE TO A SUBSCRIBER IN A COMMUNICATION NETWORK

(71) Applicant: Telefonaktiebolaget LM Ericsson (publ), Stockholm (SE)

(72) Inventors: Teresa Pascual, Karlskrona (SE); Jenny Österling, Ronneby (SE); Alexandre Carvalho Lousada, Lyckeby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 325 days.

(21) Appl. No.: 18/282,354

(22) PCT Filed: Apr. 8, 2021

(86) PCT No.: PCT/SE2021/050320
§ 371 (c)(1),
(2) Date: Sep. 15, 2023

(87) PCT Pub. No.: WO2022/216193
PCT Pub. Date: Oct. 13, 2022

(65) Prior Publication Data
US 2024/0147213 A1    May 2, 2024

(51) Int. Cl.
*H04W 8/18*    (2009.01)
*H04W 12/08*    (2021.01)
*H04W 12/72*    (2021.01)

(52) U.S. Cl.
CPC ............ *H04W 8/18* (2013.01); *H04W 12/08* (2013.01); *H04W 12/72* (2021.01)

(58) Field of Classification Search
CPC ....... H04W 8/18; H04W 12/72; H04W 12/08; H04M 15/00; H04M 15/58; H04M 15/61; H04M 15/785; H04M 15/8214
See application file for complete search history.

(56) References Cited

U.S. PATENT DOCUMENTS 6,122,352 A    9/2000  Kangas et al.
8,666,793 B2   3/2014  Guionnet
(Continued)

FOREIGN PATENT DOCUMENTS

WO    WO-2021240253 A1 * 12/2021  ............. H04W 4/24

OTHER PUBLICATIONS

International Search Report and the Written Opinion of the International Searching Authority, issued in corresponding International Application No. PCT/SE2021/050320, dated Dec. 20, 2021, 12 pages.

(Continued)

*Primary Examiner* — Wayne H Cai
(74) *Attorney, Agent, or Firm* — Rothwell, Figg, Ernst & Manbeck, P.C.

(57) ABSTRACT

Systems and methods are provided for performing service authorization for a product-related service to a subscriber in a communication network. If the service authorization request for the subscriber is received prior to a beginning of a pre-execution time window, and if the service authorization request corresponds to a scheduled service recurrence, then a validity period for a granted service quota is adjusted to ensure that a subsequent service authorization request for the subscriber will be received within the pre-execution time window. Use of the service by the subscriber with respect to one or more products is then authorized, wherein any given product has a coverage limit which covers a defined amount of service usage within the validity period.

20 Claims, 9 Drawing Sheets

(56) References Cited

U.S. PATENT DOCUMENTS

| | | |
|---|---|---|
| 9,204,280 B2 | 12/2015 | Löwenadler et al. |
| 10,044,879 B1 | 8/2018 | Oded |
| 2009/0076984 A1 | 3/2009 | Guionnet |
| 2014/0348030 A1 | 11/2014 | Törnkvist et al. |
| 2015/0087260 A1 | 3/2015 | Löwenadler et al. |
| 2016/0100063 A1 | 4/2016 | Tasker et al. |
| 2019/0158677 A1 | 5/2019 | Chai |
| 2020/0084053 A1 | 3/2020 | Åkesson |
| 2020/0127864 A1 | 4/2020 | Norberg et al. |

OTHER PUBLICATIONS

3GPP TS 32.299 V16.2.0 (Dec. 2019), 3rd Generation Partnership Project; Technical Specification Group Services and System Aspects; Telecommunication management; Charging management; Diameter charging applications (Release 16), 20 pages.

\* cited by examiner

METHODS AND SYSTEMS FOR SERVICE AUTHORIZATION FOR A PRODUCT-RELATED SERVICE TO A SUBSCRIBER IN A COMMUNICATION NETWORK

CROSS REFERENCE TO RELATED APPLICATION(S)

This application is a 35 U.S.C. § 371 National Phase Entry Application from PCT/SE2021/050320, filed Apr. 8, 2021, designating the United States, the disclosure of which is incorporated herein by reference in its entirety.

TECHNICAL FIELD

The present invention generally relates to communication networks and, more particularly, to mechanisms and techniques for service authorization of product-related services in such systems.

BACKGROUND

Over time the number of products and services provided to users of telecommunication products has grown significantly. For example, in the early years of wireless communication, devices could be used for conversations and later also had the ability to send and receive text messages. Over time, technology advanced and wireless phones of varying capabilities were introduced which had access to various services provided by network operators, e.g., data services, such as streaming video or music service. More recently there are numerous devices, e.g., so called "smart" phones and tablets, which can access communication networks in which the operators of the networks, and other parties, provide many different types of services, applications, etc. Accordingly, there need to be methods and systems for efficiently charging for services, particularly, as service offerings exist in a dynamic environment with expectations of increased volume and new types of services becoming available. Additionally, there are now multiple different radio access technologies (RATs) as well as various generations of the various RATS which further adds to this complexity.

Certain communication services may be offered to the subscribers of a given communication network according to "product offerings". For example, mobile broadband connectivity may be offered to individual subscribers of a cellular or other wireless or wired communication network in defined blocks of time, e.g., hourly. Additionally, or alternatively, the product offering may be based on discrete blocks of data transfer amounts.

In one approach, such products are pre-provisioned in a subscriber database responsive to subscriber input, e.g., pre-purchases through a web portal, or they are pre-provisioned based on scheduled or automatic processing running within the communication network. Because usage of a product-related service is authorized for a given subscriber based on there being related products already provisioned for that subscriber, the network operator is obliged to pre-provision and store potentially large numbers of products in its subscriber database.

For example, for a mobile broadband service having a product offering in which connectivity is provided in one-hour increments, the network operator might, for each subscriber that is eligible for the service, provision twenty-four products to cover the next twenty-four hour usage period. Each such product corresponds to a specific one of the hours and is tied to a corresponding one of the eligible subscribers. Similarly, the network operator may make a product offering in which subscribers are allowed 1 GB of data transfer per month, where usage is assessed in 25 MB increments. For each such subscriber, the network operator would, in one approach to pre-provisioning, provision forty 25 MB products at a minimum, to cover the monthly product offering. In this context, a 25 MB product will be understood as a record that covers or authorizes up to 25 MB in data transfer by a given subscriber.

However, with this approach, all the subscribers that have signed up for a given offer have to have their corresponding products available for authorizing actual service usage and all such products must be stored in advance in the subscriber database. Product storage quickly becomes burdensome. In the 24-hour and/or monthly data transfer product offering described above, the network operator would generate from twenty-four to forty products per subscriber, depending on which product offering the subscriber selected. Example numbers of 600,000 subscribers and fifty bytes of storage required per product imply storage requirements of 720 MB to 1.2 GB for the pre-provisioned products. That amount of data is prohibitive, particularly because of the way subscriber databases are used in real-time within the network charging systems.

U.S. Pat. No. 9,204,280 describes a solution to this problem. As described therein a dynamic, service-triggered provisioning of products is provided, for use in authorizing product-related services to subscribers in a communication network. This approach obviates the need to pre-provision products to cover the possible usage of such services by eligible subscribers, which in turn means that the subscriber database memory requirements are reduced to the extent that the database does not need to hold potentially large numbers of pre-provisioned products. In one embodiment, the number of products needed to cover an initial usage quota is speculatively generated responsive to a charging trigger and service to the involved subscriber is authorized using those speculatively generated products. Unused products are deleted and new products are generated as needed, to cover continued or subsequent usage of the service by the subscriber.

This approach for speculating on future units to be reserved as a result of a service request involves checking on existing scheduled recurrences that are going to be executed within the validity time of the units (quota) to be granted for the request. This means that in situations where a long validity time is defined (e.g., 24 hours for some data services), the speculation on future units may happen a long time (e.g., 24 hours) before the actual recurrence execution of the service itself. The larger the gap in in time that the speculation occurs relative to the real service execution, the higher the risk of revenue loss to the network operator because the probability increases that circumstances associated with the expected recurrence will change during that time period and, then, the speculated recurrence execution may not actually occur.

Accordingly, there is a need to provide methods and systems that overcome the above-described drawbacks associated with service authorization in telecommunication networks.

SUMMARY

Embodiments allow for risks associated with speculative product provisioning in telecommunication systems to be controlled by controlling how far in advance of a recurrence event the speculative product provisioning can be performed.

According to an embodiment, there is a method of service authorization for a product-related service to a subscriber in a communication network. A service authorization request arising from a service activity by the subscriber is received. If the service authorization request for the subscriber is received prior to a beginning of a pre-execution time window, and if the service authorization request corresponds to a scheduled service recurrence, then a validity period for a granted service quota is adjusted to ensure that a subsequent service authorization request for the subscriber will be received within the pre-execution time window. Then use of the service by the subscriber with respect to one or more products is authorized, wherein any given product has a coverage limit which covers a defined amount of service usage within the validity period.

According to an embodiment, there is a network node configured to facilitate charging usage of a product-related service to a subscriber in a communication network. The network node includes a communication interface configured to receive a service authorization request arising from a service activity by the subscriber. The network node also includes a processing circuit operatively associated with the communication interface and configured to: if the service authorization request for the subscriber is received prior to a beginning of a pre-execution time window and if the service authorization request corresponds to a scheduled service recurrence, then adjust a validity period for a granted service quota to ensure that a subsequent service authorization request for the subscriber will be received within the pre-execution time window; and authorize use of the service by the subscriber with respect to one or more products, wherein any given product has a coverage limit which covers a defined amount of service usage within the validity period.

According to an embodiment, there is a computer-readable storage medium containing a computer-readable code that when read by a processor causes the processor to perform a method of service authorization for a product-related service to a subscriber in a communication network. A service authorization request arising from a service activity by the subscriber is received. If the service authorization request for the subscriber is received prior to a beginning of a pre-execution time window, and if the service authorization request corresponds to a scheduled service recurrence, then a validity period for a granted service quota is adjusted to ensure that a subsequent service authorization request for the subscriber will be received within the pre-execution time window. Then use of the service by the subscriber with respect to one or more products is authorized, wherein any given product has a coverage limit which covers a defined amount of service usage within the validity period.

According to an embodiment, there is an apparatus adapted to receive a service authorization request arising from a service activity by the subscriber; wherein if the service authorization request for the subscriber is received prior to a beginning of a pre-execution time window and if the service authorization request corresponds to a scheduled service recurrence, then the apparatus is adapted to adjust a validity period for a granted service quota to ensure that a subsequent service authorization request for the subscriber will be received within the pre-execution time window; and to authorize use of the service by the subscriber with respect to one or more products, wherein any given product has a coverage limit which covers a defined amount of service usage within the validity period.

According to an embodiment, there is an apparatus including a first module configured to receive a service authorization request arising from a service activity by the subscriber, a second module configured to, if the service authorization request for the subscriber is received prior to a beginning of a pre-execution time window and if the service authorization request corresponds to a scheduled service recurrence, then adjust a validity period for a granted service quota to ensure that a subsequent service authorization request for the subscriber will be received within the pre-execution time window and a third module configured to authorize use of the service by the subscriber with respect to one or more products, wherein any given product has a coverage limit which covers a defined amount of service usage within the validity period.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. The embodiments to be discussed next are not limited to the configurations described below, but may be extended to other arrangements as discussed later.

Reference throughout the specification to "one embodiment" or "an embodiment" means that a particular feature, structure or characteristic described in connection with an embodiment is included in at least one embodiment of the present invention. Thus, the appearance of the phrases "in one embodiment" or "in an embodiment" in various places throughout the specification is not necessarily all referring to the same embodiment. Further, the particular features, structures or characteristics may be combined in any suitable manner in one or more embodiments.

As described in the Background section, there are problems associated with service authorization associated with the speculative provisioning of products in telecommunication systems when the time between when the service authorization occurs and when the potential usage of the products actually might occur is relatively long. These problems are controlled by enabling a network operator to close this time gap, as will be described below. Initially, however, a telecommunication system in which the embodiments can be used will first be described with respect to FIG. 1 and FIG. 2.

Figure 1:
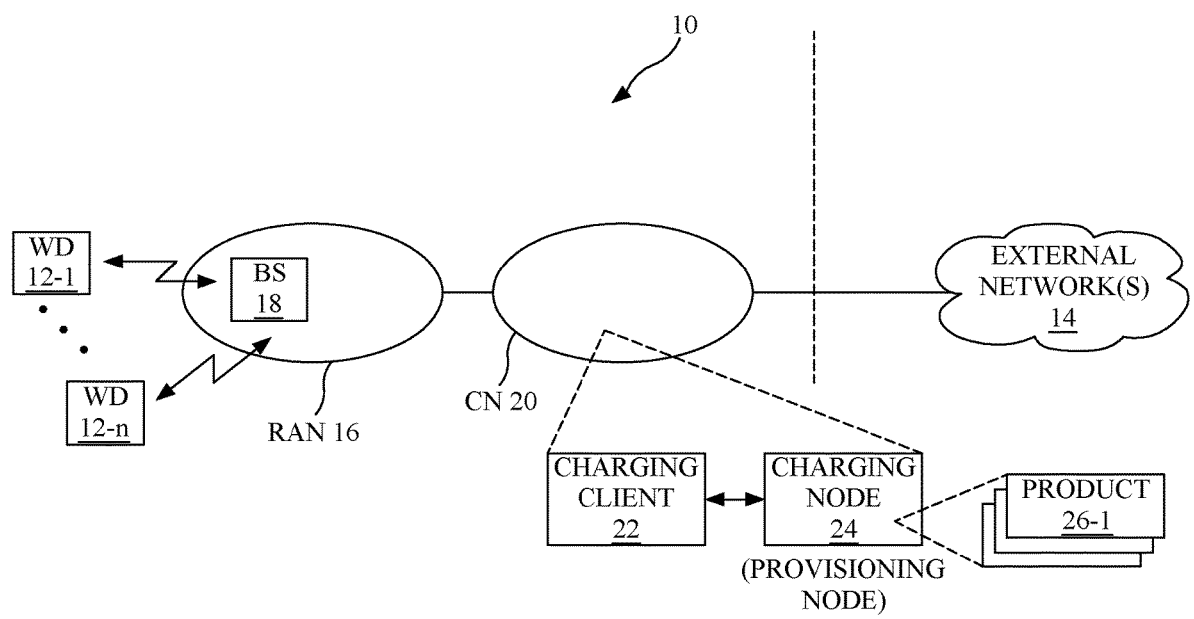
FIG. 1 illustrates a portion of a telecommunication system including a charging node.

FIG. 1 is a block diagram of one embodiment of a communication network 10, referred to simply as the "network 10." By way of example, the network 10 is a cellular communication network, such as a Long Term Evolution, LTE, or Wideband CDMA, WCDMA, or 5G network, according to the specifications of the Third Generation Partnership Project, 3GPP. The network 10 provides communication services to a number of subscribers, represented herein by their corresponding devices 12. In particular, devices 12-1 through 12-n are depicted, merely to indicate that there may be a potentially large plurality of such devices associated with the network 10, although only selected ones of them may be active at any given time. The devices 12 may be user equipments, or UEs in 3GPP parlance, and more broadly may be any type of mix of wireless or wired communication devices, such as cellular telephones, including smartphones and/or feature phones, tablets, computers, etc.

Indeed, while the network 10 in an example case is a cellular communication network 10 and the devices 12 represent wireless terminals, it will be appreciated that the teachings herein are not limited to wireless devices, and instead are directly applicable to other types of devices that may consume product-related services, including stationary wire-line devices, such as desktop computers, etc. Thus, unless otherwise noted, references to wireless devices will be understood merely as a non-limiting example for discussion purposes.

In an example, the network 10 provides mobile broadband connectivity to at least some of the devices 12, e.g., by connecting them with one or more external networks 14, such as the Internet or other packet data networks, PDNs. Of course, this is a non-limiting example, and the network 10 may provide other services, such as voice services, either additionally or alternatively. The network 10 includes a Radio Access Network, RAN, 16, which includes a potentially large number of base stations 18, e.g., geographically distributed base stations providing coverage of over a potentially large geographic area. For simplicity, the diagram depicts only one base station 18, but there generally will be multiple base stations and other nodes, such as relays, positioning nodes, mobility-related entities, etc. Further, the RAN 16 may be a homogeneous network made up of like base stations 18, e.g., macro or large-area base stations, or the RAN 16 may be a heterogeneous network comprising a mix of macro and micro base stations 18, with hotspots or overlaid service provided by a number of pico cells.

The network 10 further includes a Core Network or CN 20, which here is greatly simplified. In an LTE embodiment, the CN 20 comprises an Evolved Packet Core or EPC, and includes various operational entities, including Mobility Management Entities or MMEs, packet gateways, a Home Subscriber Server, HSS, etc. These entities are not shown for the sake of simplicity and instead the diagram emphasizes the online/offline charging functions associated with the network 10, based on the depiction of a charging client 22 and a charging node 24. Together, these nodes form all or at least a portion of an overall "charging system" that is responsible for recording service usage by respective ones of the network subscribers, charging corresponding subscriber accounts, etc., which is sometimes alternatively referred to herein as an online charging system (OCS). The charging node 24 can provision and authorize service of various service-related products 26.

Figure 2:
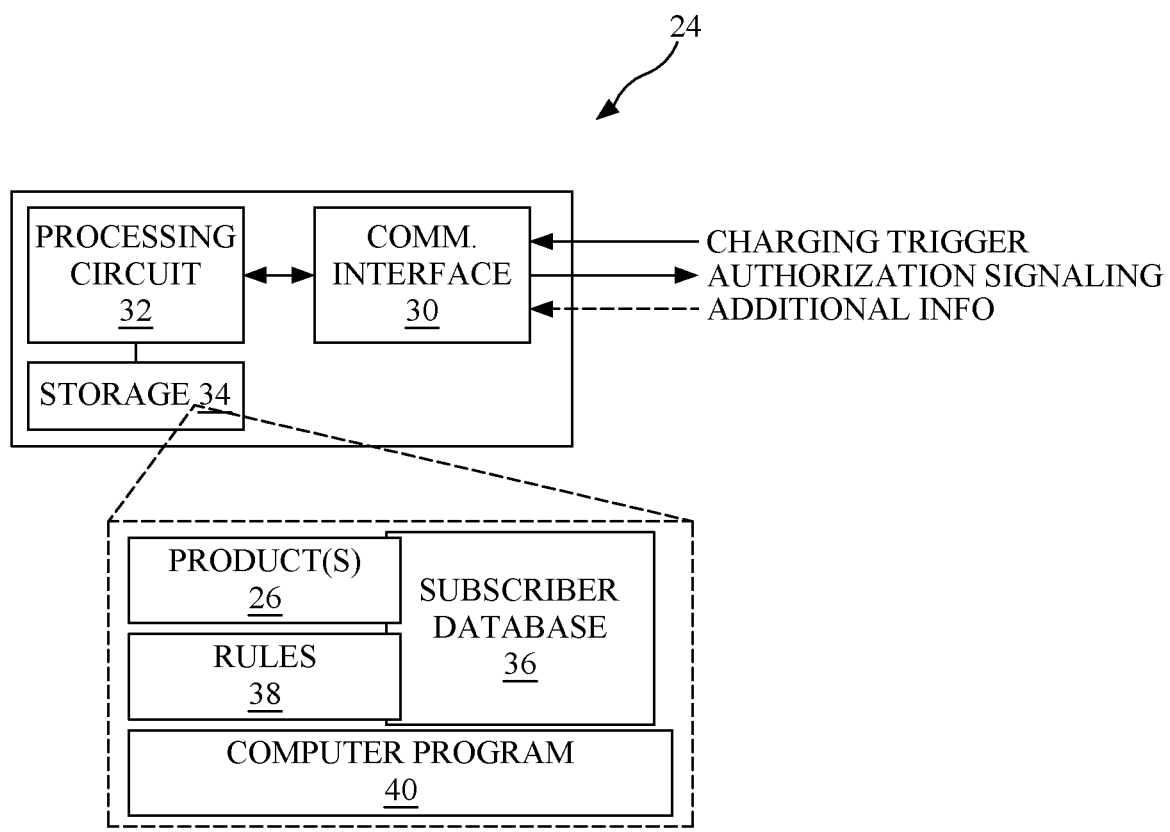
FIG. 2 depicts the charging node in FIG. 1 in more detail.

FIG. 2 depicts an example embodiment of the charging node 24, which is also referred to as a "network node 24" or simply as the "node 24." The node 24 includes a communication interface 30 and a processing circuit 32. The processing circuit 32 includes or has access to storage 34 that stores a subscriber database 36 that, at any given time, stores products 26 in any one of several states as defined herein. The storage 34 also stores one or more sets of product provisioning rules 38, for provisioning products 26 in accordance with any number of product offerings.

While the node 24 may be a separate, self-contained computer server, it also may be a distributed node that is functionally implemented across multiple computer systems within the CN 20. Likewise, the processing circuit 32 will be understood to comprise one or more microprocessor circuits or other digital processing circuitry. In some embodiments, the processing circuit 32 is specially adapted to perform the product provisioning operations taught herein, based on its execution of program instructions from a computer program 40 stored in the storage 34. In that regard, the storage 34 will be understood as comprising one or more types of computer-readable media configured for persistent, non-transitory storage of data and instructions, e.g., non-volatile memory and/or disk storage. Of course, the storage 34 further includes dynamic, working memory in some embodiments, such as for holding working copies of all or part of the subscriber database 36 or individual subscriber records therein.

With the above non-limiting example details in mind, the node 24 is configured to facilitate charging usage of a product-related service to a subscriber in the network 10. To support that functionality, the communication interface 30 is configured to receive a charging trigger arising from a service activity by the subscriber. In an example implementation, the communication interface 30 includes physical-layer interface circuitry and associated higher-layer protocol processing circuitry, supporting the exchange of charging-related messages. Further, a "service activity" in this context means initiation of a product-related service by a given subscriber, such as the subscriber initiating a packet data connection to the network 10 with respect to metered broadband service, receiving or placing a voice call with respect to a prepaid or hourly service plan, etc. It will be understood that the subscriber uses a corresponding device 12, for example a wireless device, to initiate and engage in these activities.

The processing circuit 32 is operatively associated with the communication interface 30 and is configured to authorize use of a product-related service by a subscriber with respect to one or more products 26 when a recurrence event is upcoming within a time window selected by a network operator as will be described below with respect to FIGS. 4-8. Here, any given product 26 "covers" a defined amount of service usage. For example, a broadband data service may be metered in hourly increments and/or in increments of 25

MBs of data transfer, and a corresponding product 26 covers up to 25 MB of data transfer. Next several charging scenarios are described.

First of all, consider initially a scenario where the charging node 24 does not track recurring service requests and does not speculatively provision products. For instance, suppose that it is the case that a given network operator has many customers having the same daily recurrent data product as their last remaining data product resource, in this example right before the end of the day, i.e., at midnight (ooh). In this example, without speculation, the charging node 24 would grant the last quota with its validity time set to midnight to each customer. That means that all customers' sessions would come back to request more units at the same time, exactly at the recurrence time, i.e., ooh. That, in turn, would cause a signaling spike of usage interrogation requests towards the charging node 24, flooding the network.

Figure 3:
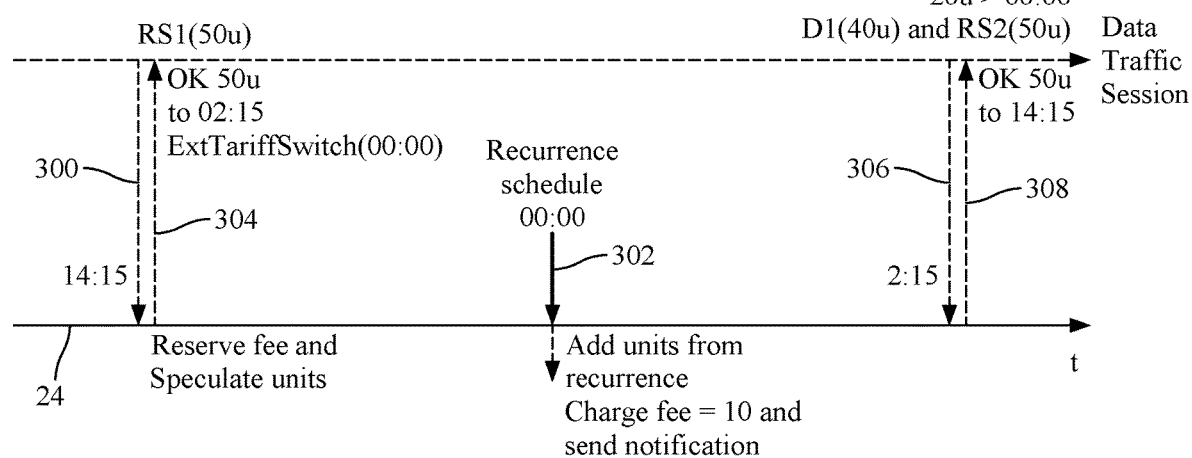
FIG. 3 shows speculative service authorization without a pre-execution recurrence event window.

This problem can be addressed using speculative provisioning of products as shown in FIG. 3 and described in the Background above. Therein, at time 14:15, the charging node 24 receives a reservation request 300, determines that there is an upcoming recurrence event at midnight as shown by arrow 302, and then reserves the needed fee to speculatively provision product for this subscriber as indicated by arrow 304. Effectively, at speculation 304, the recurrence event is pre-executed and quota is granted taking into account the speculated units which are assumed to be available when the actual recurrence event occurs, e.g., as represented by arrows 306 and 308 in FIG. 3. If, however, the recurrence event does not actually occur, then the network operator may suffer losses associated with the speculated units.

Thus, according to embodiments described in more detail below, a pre-execution window is provided to enable the network operator to better control potential losses associated with the service authorization of speculated product units. A brief example is first provided with respect to the embodiment of FIG. 4, and more detailed embodiments are then discussed with respect to FIGS. 5 and 6.

Figure 4:
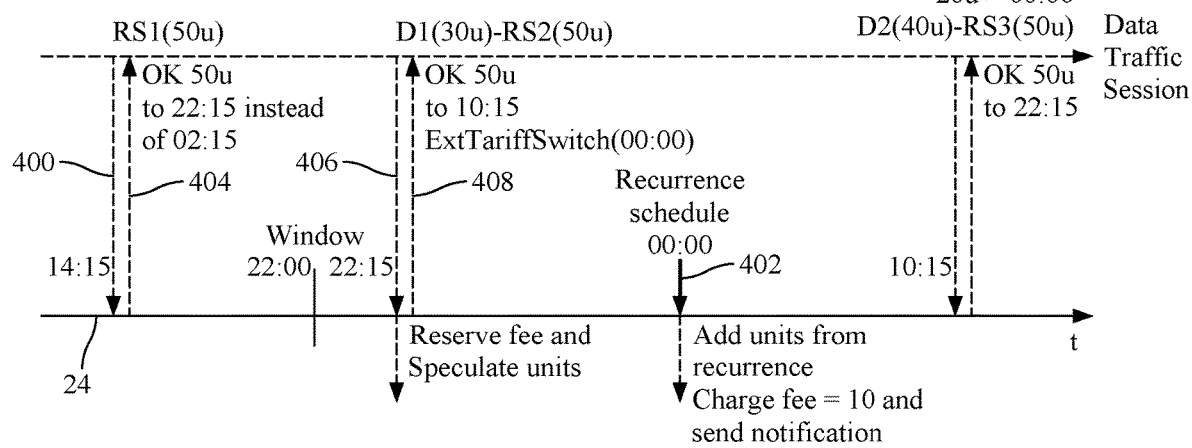
FIG. 4 shows speculative service authorization with a pre-execution recurrence event window according to an embodiment.

Referring to FIG. 4, when a reservation request 400 arrives, charging node 24 checks to determine if there is some scheduled recurrence within the time period of what would be that validity of the quota to be granted. In this case there is a scheduled recurrence at 00:00 represented by arrow 402. If so, and if that scheduled recurrence 402 also allows pre-execution, then speculation of units does not occur immediately. Instead charging node 24 will still grant a last quota (arrow 404) before the scheduled recurrence 402, ensuring that the next interrogation will come back to the charging node 24 within a defined time period before and closer to the real recurrent execution.

That means that this last granted quota validity time in signal 404 is adjusted and distributed (e.g., randomly) to end before the scheduled recurrence 402, i.e., within the pre-execution recurrence time window. In the example of FIG. 4, signal 404 sets the adjusted validity time to be 22:15 such that the next interrogation 406 comes back to the charging node 24 at 22:15 which is prior to the recurrence event schedule of 00:00 and after the beginning of the pre-execution recurrence time window, in this example 22:00. Then the charging node 24 reserves the needed fee and speculates units at 22:15 (instead of 14:15 as in FIG. 3). This adjustment of the granted quota validity time will distribute the next interrogation requests received by the charging node 24 within the time window.

Two use cases of the embodiments can be considered in more detail. First is the case (like that of FIG. 4) where a received usage request (RSU) has recurrence scheduled within its validity time but is not yet within the pre-execution recurrence time window. This use case is discussed below with respect to FIG. 5. Second is the case when a usage request is received within the pre-execution recurrence time window. This use case is discussed below with respect to FIG. 6.

Figure 5:
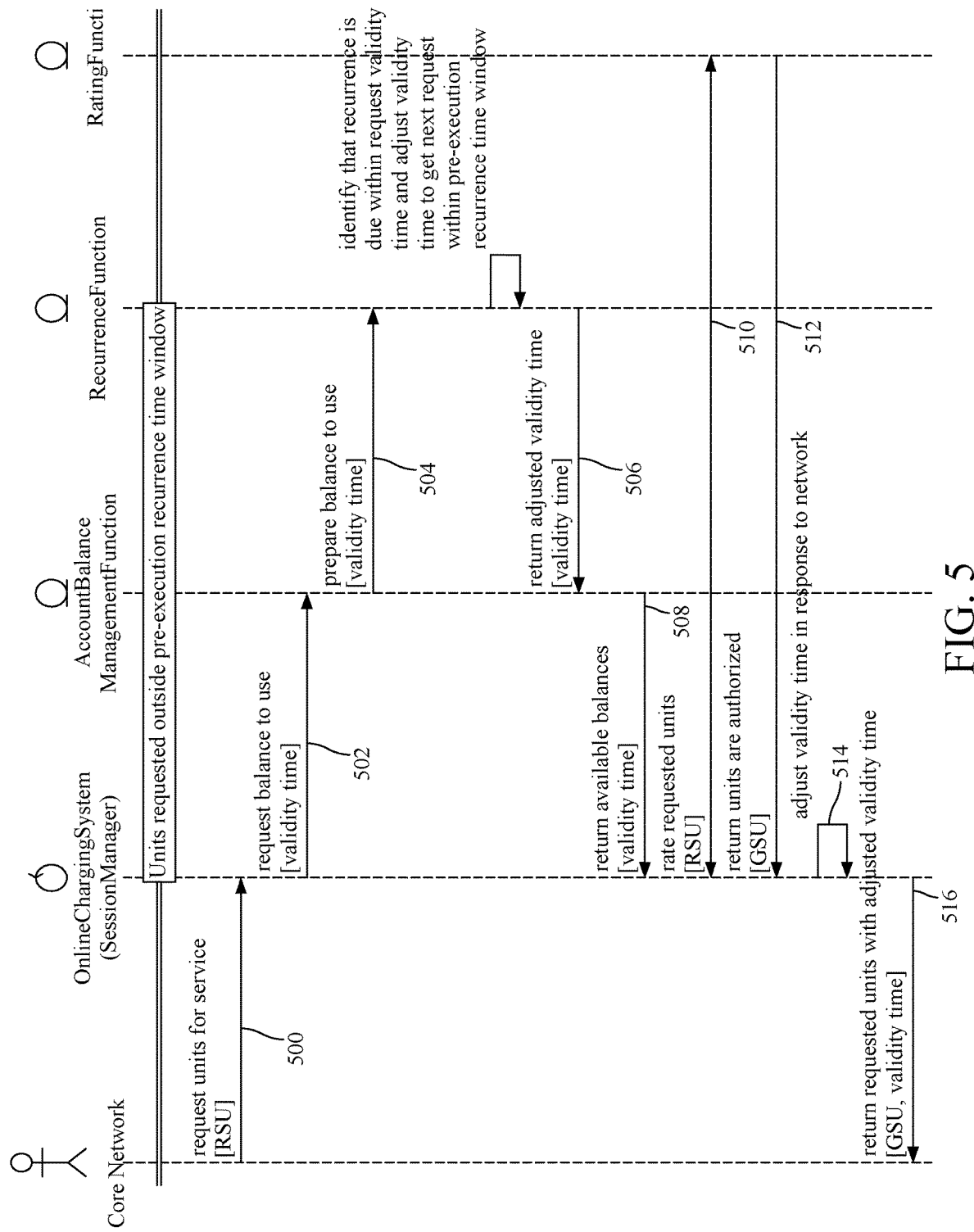
FIG. 5 illustrates signaling associated with service authorization with a pre-execution recurrence event window for the case when a request for service is received outside of the window according to an embodiment.

Starting with FIG. 5, a client makes a connection request 500 to the Online Charging System (OCS), e.g., charging node 24, through the core network. As part of the request (or through configuration in OCS), the OCS will find the number of units to grant (called RSU or requested units) and set a validity time for the grant. The session and request manager inside the OCS will read the validity time for the requested units from the configuration and send a request 502 to the Account Balance Management Function (ABMF) to fetch and prepare all balances that are valid for the service. The ABMF sends a request 504 to the Recurrence Function (RF) to see if any recurrence is due to be executed. The RF will identify that the request 500 is not received within the pre-execution recurrence time window, but that there is a recurrence job due within the configured validity time for the service request 500.

The RF will then calculate a new validity time for the service request 500 to ensure that the next service update will be received within the pre-execution recurrence time window and return the value as signal 506. The ABMF will return available balances for the service request as shown by signal 508. The requested units are sent to a Rating Function for authorization as shown by signal 510. The request 510 includes the available balances. The Rating Function uses the available balances and configured rules to calculate how many units to grant and will return a signal indicating authorized units to the OCS as signal 512. The session and request manager will set the validity time of the granted units to the adjusted value that was suggested by the recurrence function as indicated by arrow 514. A response 516 is sent to the client with granted units and validity time.

Figure 6:
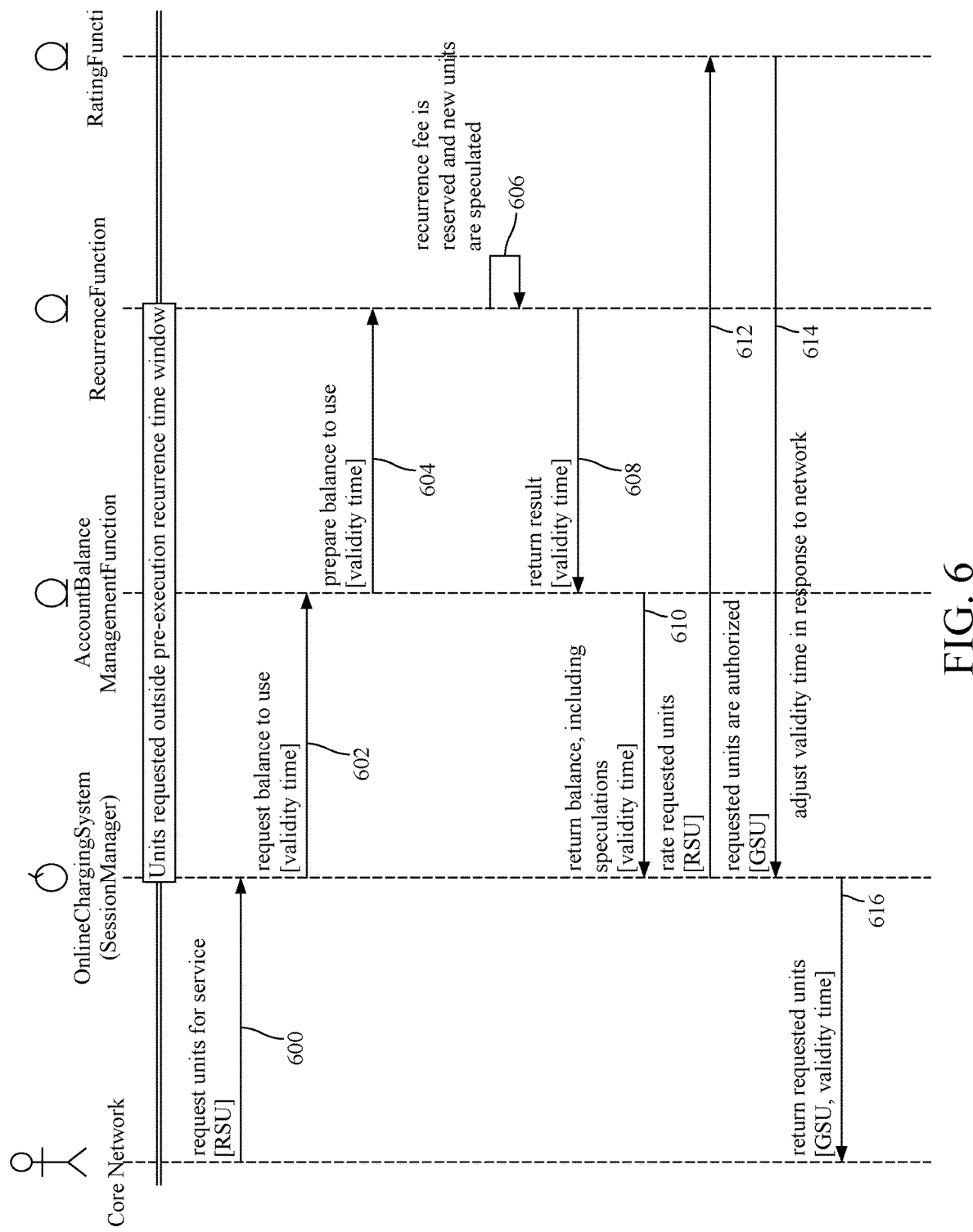
FIG. 6 illustrates signaling associated with service authorization with a pre-execution recurrence event window for the case when a request for service is received inside of the window according to an embodiment.

Not shown in FIG. 5, but as discussed above with respect to FIG. 4, the subscriber's UE will again request service at the end of the adjusted validity time, which will result in the second request for service being received by the OCS within the pre-execution recurrence time window, at which time the process can occur as discussed below with respect to FIG. 6.

Therein, client makes a connection request 600 to the OCS through the core network. As part of the request 600 (or through configuration in OCS) the OCS will find the number of units to grant (called RSU or requested units) and set a validity time for the grant. The session and request manager inside the OCS will read the validity time for the requested units from the configuration and send a request 602 to the Account Balance Management Function (ABMF) to fetch and prepare all balances that are valid for the service. The ABMF sends a request 604 to the Recurrence Function (RF) to see if any recurrence is due to be executed. The RF will identify that the request 500 is received within the pre-execution recurrence time window and will, therefore, pre-execute the recurrence—i.e., recurrence fee is reserved, and units are speculated as indicated by arrow 606.

The RF returns the result via signal 608. The ABMF will return available balances for the service request, including the reserved recurrence fee and speculated units, via signal 610. The requested units are sent to rating for authorization via request 612. The request 612 contains the available balances. The Rating Function uses the available balances and configured rules to calculate how many units to grant and returns an indication of authorized units via signal 614. A response 616 is sent to the client with granted units and validity time.

Two aspects of these embodiments will now be discussed in more detail, i.e., how to define the size of the pre-execution recurrence window and how to distribute requests for service within the pre-execution recurrence window. Regarding the first aspect, which defines e.g., how early a scheduled recurrence can be run in advance due to speculation of units, various approaches can be considered to enable a network operator to choose the approach that fits its needs best. For example, the window can be defined statically or dynamically.

For embodiments which employ a statically defined pre-execution window, the window size is statically defined as a time period based on what is configured in the system, which configuration can be defined, for example, at the system level, the subscription level, the product level or the service level. In this regard the contract level can enable the window time period to be set based on the type of contract that a subscriber has with the network operator since customers which are paying more of a premium (e.g., platinum, gold, silver levels) since those who pay more are less likely to default on recurrence fees such that those customers could have a longer static time window. Similarly, with respect to windows which are statically defined based on product level, the time window could be longer for less costly products and shorter for more expensive products such that the value of non-payment by the customer is balanced against the likelihood of non-recurrence as a function of time. With respect to windows which are defined based on a service level, such embodiments could, for example, take into consideration whether the service associated with a product to be provisioned is a roaming or an at home service. Roaming services could be associated with smaller time windows than at home services, since revenue losses can be higher for unused roaming services. Statically defined pre-execution recurrence windows can be defined using, e.g., absolute time values (e.g., 1 hour) or relative values, e.g., relative to the size of the configured quota validity to be granted (e.g., 10%).

By way of contrast, for embodiments which employ dynamically defined pre-execution windows, the window size is dynamically defined (e.g., at runtime), when the first RSU arrives before recurrence execution is granted. This can be performed in a number of different ways, for example based on user traffic. In this scenario, and, e.g., based on machine learning (ML) techniques, the OCS analyzes the user's consumption history, and decides the window size to be applied, as explained below.

As an example, the input of all reported consumed units per subscriber for a certain period, e.g., 30 days, can be used as a feature feeding a training model (e.g., a time series analysis-based model). By the time the OCS needs to re-assess the window size, the resulting prediction model would provide an estimated consumption value for that particular time frame, i.e., when approaching the scheduled recurrence event. The estimated value will then be used to calculate the optimal pre-execution window size. The usage of a time series analysis-based model adds an explicit order dependence between observations, a time dimension. This additional dimension is both a constraint and a structure that provides a source of additional information. The time is used to find a pattern from the dataset.

Thus, for example, a user having an intense data usage profile, should have a smaller window size since they spend the GSU sooner than the granted validity time and the speculation is minimized. Whereas if the same user is not having an intense usage, the window size can be increased, since the probability to spend the GSU sooner than the granted validity time is smaller. For an example, a user normally surfing in the evening close to a recurrence event scheduled at 24:00 will be assigned a shorter pre-execution window size because the model will detect that this user normally consumes a lot at this time.

Having described how various embodiments can select the size or length of the pre-execution recurrence window, the discussion now moves on to how embodiments can distribute service requests within the window to, e.g., balance system load. As mentioned above, the repeating of service requests to enable them to be received within the window can be achieved by adjusting the validity time of a granted quota. Thus distribution of the subsequently received service requests within that window can be performed by varying the validity times of different quotas being handled by the OCS or charging node 24. One way to do this is to randomly distribute that validity times within the window. Another way to do this is to use an algorithm to distribute the validity times within the window in a manner which suits the operator's needs.

Figure 7:
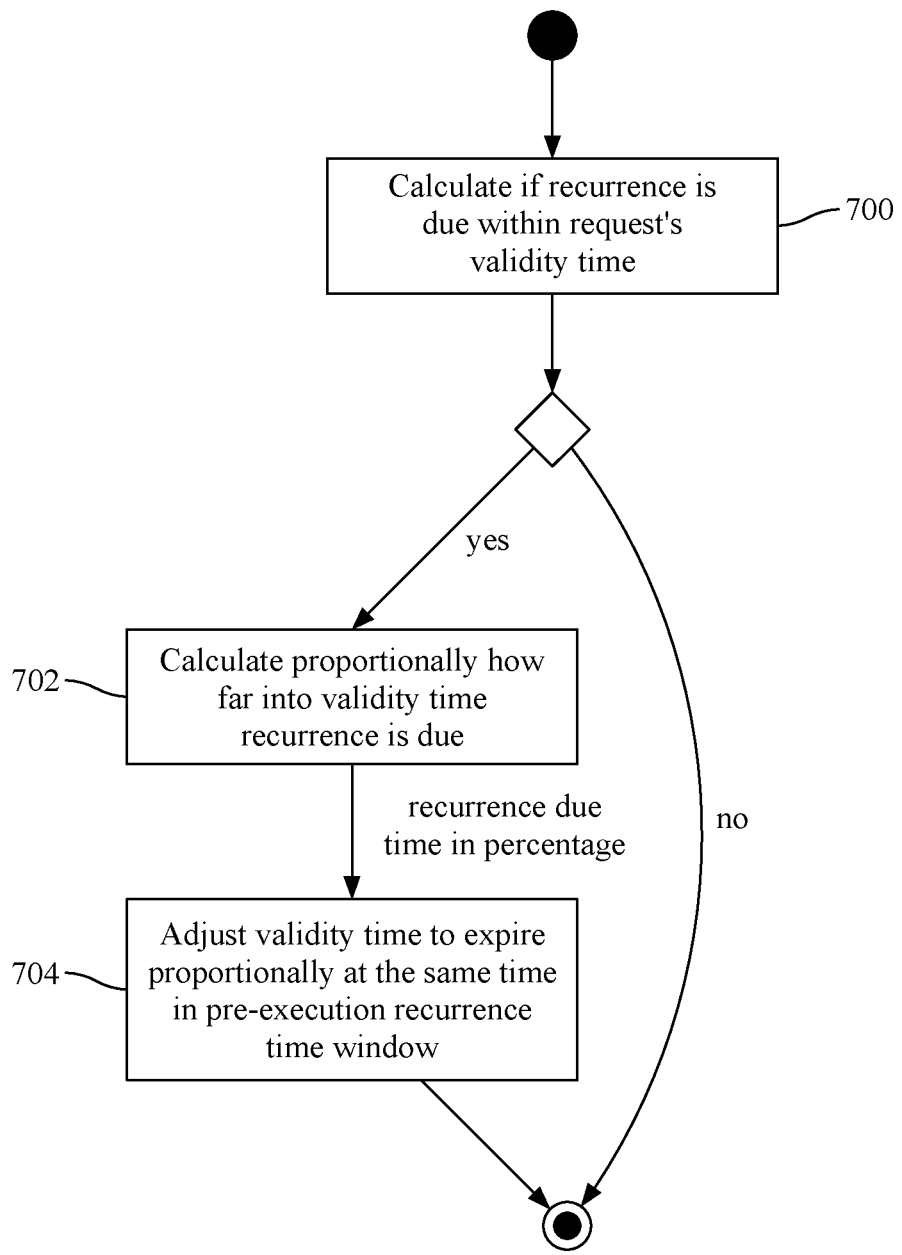
FIG. 7 is a flow chart illustrating a method for distributing requests within the window according to an embodiment.

According to an algorithmic distribution embodiment, illustrated in FIG. 7, it is first determined at step 700 whether a recurrence is due within a current request's validity time. If not, then the process terminates. However if so, then the distribution algorithm can calculate where proportionally in the validity time of the current request the scheduled recurrence is due at step 702. Then, the algorithm adjusts the validity time of the current request to expire proportionally at the same time in the pre-execution recurrence time window at step 704. Example: Scheduled recurrence is due at 42% of the validity time. Adjust validity time to expire 42% into the pre-execution recurrence time window.

Figure 8:
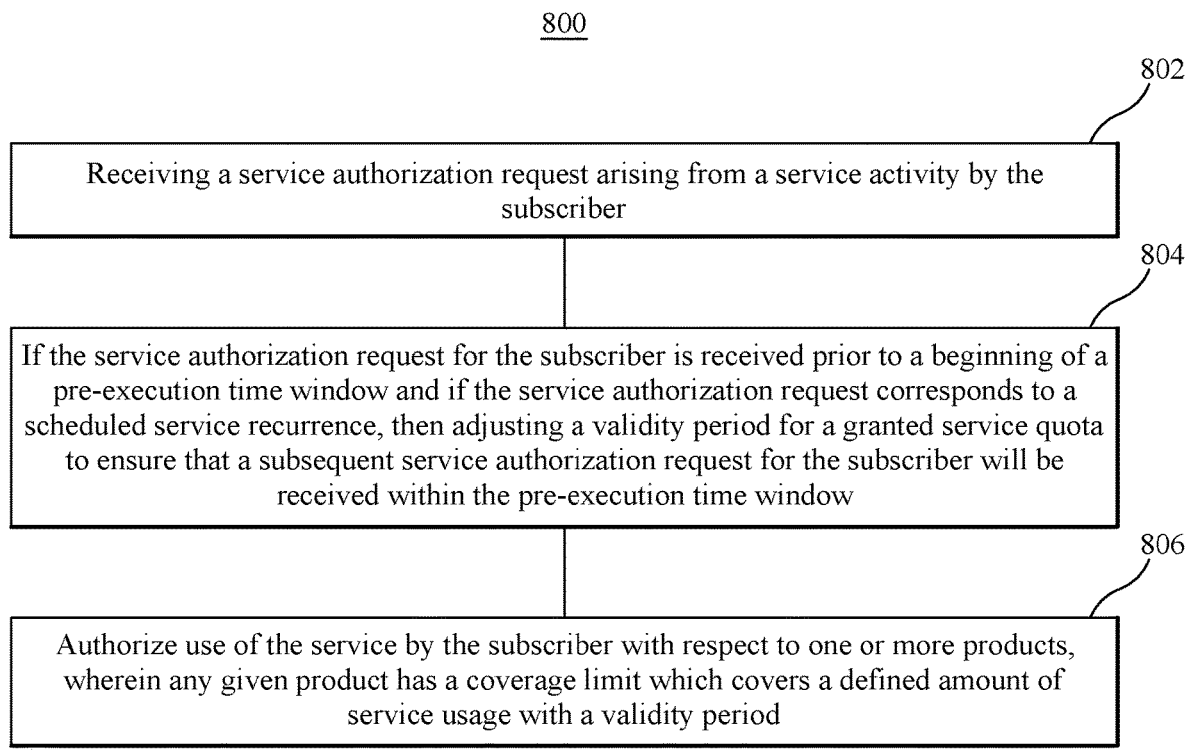
FIG. 8 is a flow chart illustrating a method for service authorization according to an embodiment.

Another method embodiment is illustrated in the flow diagram of FIG. 8. Therein, a method 800 of service authorization for a product-related service to a subscriber in a communication network is shown. At step 802 a service authorization request arising from a service activity by the subscriber is received. If the service authorization request for the subscriber is received prior to a beginning of a pre-execution time window and if the service authorization request corresponds to a scheduled service recurrence, then (at step 804) a validity period for a granted service quota is adjusted to ensure that a subsequent service authorization request for the subscriber will be received within the pre-execution time window. Then, use of the service by the subscriber with respect to one or more products is authorized at step 806, wherein any given product has a coverage limit which covers a defined amount of service usage within the validity period.

Figure 9:
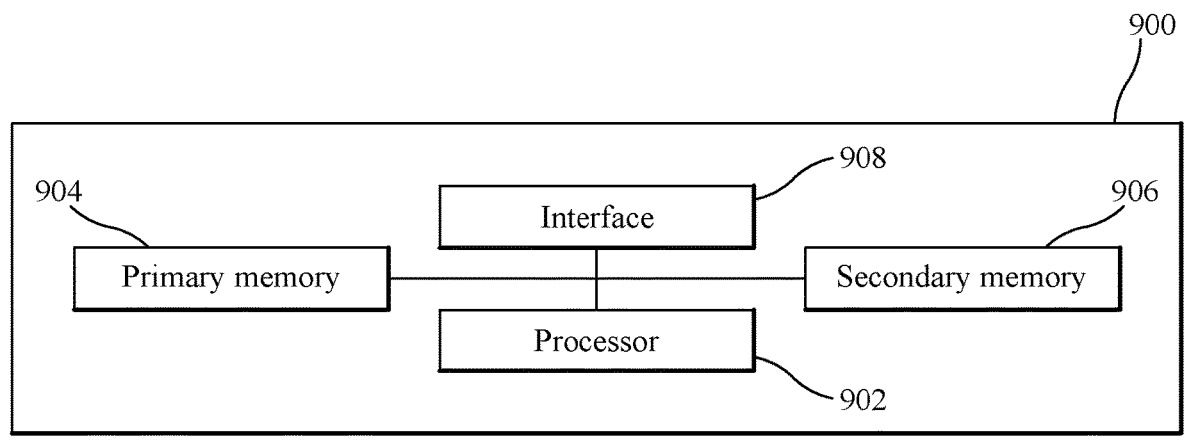
FIG. 9 illustrates a node which can be used to implement embodiments.

Embodiments described above can also be implemented in one or more nodes (or servers). An example of a communication node 900 is shown in FIG. 9. The communication node 900 (or other network node) includes a processor 902 for executing instructions and performing the functions described herein, e.g., the functions performed by the nodes/equipment shown in FIGS. 5-6. The communication node 900 also includes a primary memory 904, e.g., random access memory (RAM) memory, a secondary memory 906 which can be a non-volatile memory, and an interface 908 for communicating with other portions of a network or among various nodes/servers in support of charging.

Processor 902 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in conjunction with other communication node 900 components, such as memory 904 and/or 906, node 900 functionality in support of the various embodiments described herein. For example, processor 902 may execute instructions stored in memory 904 and/or 906.

Primary memory 904 and secondary memory 906 may comprise any form of volatile or non-volatile computer readable memory including, without limitation, persistent storage, solid state memory, remotely mounted memory, magnetic media, optical media, RAM, read-only memory (ROM), removable media, or any other suitable local or remote memory component. Primary memory 904 and secondary memory 906 may store any suitable instructions, data or information, including software and encoded logic, utilized by node 900. Primary memory 904 and secondary memory 906 may be used to store any calculations made by processor 902 and/or any data received via interface 908.

Communication node 900 also includes communication interface 908 which may be used in the wired or wireless communication of signaling and/or data. For example, interface 908 may perform any formatting, coding, or translating that may be needed to allow communication node 900 to send and receive data over a wired connection. Interface 908 may also include a radio transmitter and/or receiver that may be coupled to or a part of the antenna. The radio may receive digital data that is to be sent out to other network nodes or wireless devices via a wireless connection. The radio may convert the digital data into a radio signal having the appropriate channel and bandwidth parameters. The radio signal may then be transmitted via an antenna to the appropriate recipient.

Embodiments provide various advantages or improvements to enhance an operator's control over revenue losses associated with speculatively provisioning products by, for example, allowing the definition of an interval when preexecution of recurrence can occur. This definition of an adjusted/reduced pre-execution time window represents a smaller chance to have changes on the conditions that ruled the speculation. The embodiments also offer a flexible way to configure the size of the pre-execution time window, ensuring that the operator has the possibility to have specific windows sized according to the scenario taking place, thus minimizing risks even more. Moreover, embodiments allow an optimized execution of the speculative recurrence, by providing the option to the OCS to dynamically decide the size of the pre-execution window for recurrence (consequently tailoring then when the pre-execution can occur) for example, based on the current ongoing user traffic profile.

Various embodiments described herein refer in some fashion to nodes, e.g., nodes which support functions associated with charging. In some embodiments the non-limiting communication node (also interchangeably called a node or telecommunication node) is more commonly used and it refers to any type of network node which directly or indirectly communicates with a user equipment (UE), a node in one or more operator networks, and a core network.

The disclosed embodiments provide methods and devices for service authorization of products associated with a potential recurrence event. It should be understood that this description is not intended to limit the invention. On the contrary, the embodiments are intended to cover alternatives, modifications and equivalents, which are included in the spirit and scope of the invention. Further, in the detailed description of the embodiments, numerous specific details are set forth in order to provide a comprehensive understanding of the claimed invention. However, one skilled in the art would understand that various embodiments may be practiced without such specific details.

Figure 10:
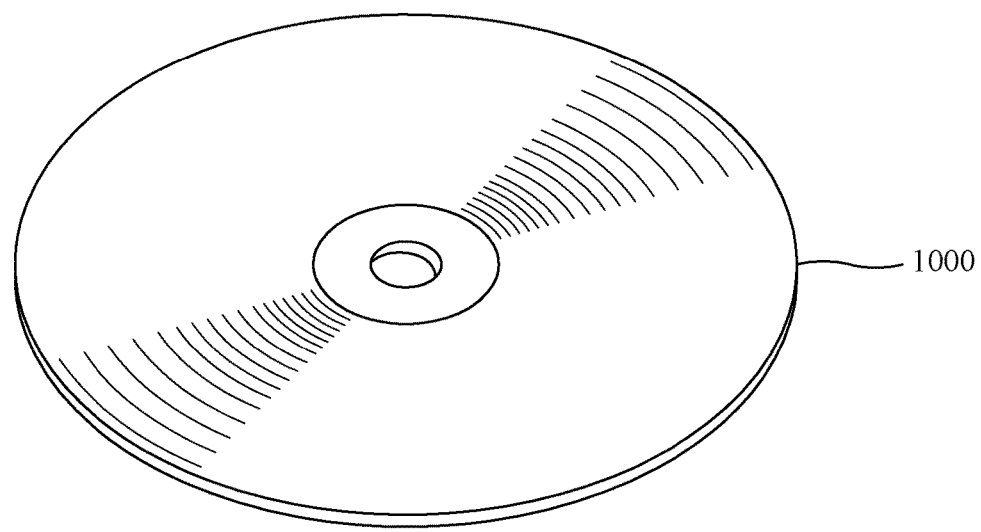
FIG. 10 depicts an electronic storage medium on which computer program embodiments can be stored.

As also will be appreciated by one skilled in the art, the embodiments may take the form of an entirely hardware embodiment or an embodiment combining hardware and software aspects. Further, the embodiments, e.g., the configurations and other logic associated with the charging process to include embodiments described herein, such as, the methods associated with FIG. 8, may take the form of a computer program product stored on a computer-readable storage medium having computer-readable instructions embodied in the medium. For example, FIG. 10 depicts an electronic storage medium 1000 on which computer program embodiments can be stored. Any suitable computer-readable medium may be utilized, including hard disks, CD-ROMs, digital versatile disc (DVD), optical storage devices, or magnetic storage devices such as floppy disk or magnetic tape. Other non-limiting examples of computer-readable media include flash-type memories or other known memories.

Although the features and elements of the present embodiments are described in the embodiments in particular combinations, each feature or element can be used alone without the other features and elements of the embodiments or in various combinations with or without other features and elements disclosed herein. The methods or flowcharts provided in the present application may be implemented in a computer program, software or firmware tangibly embodied in a computer-readable storage medium for execution by a specifically programmed computer or processor.

What is claimed is:

1. A method of service authorization for a product-related service to a subscriber in a communication network, said method comprising:

receiving a service authorization request arising from a service activity by the subscriber;

if the service authorization request for the subscriber is received prior to a beginning of a pre-execution time window and if the service authorization request corresponds to a scheduled service recurrence, then adjusting a validity period for a granted service quota to ensure that a subsequent service authorization request for the subscriber will be received within the pre-execution time window; and authorizing use of the service by the subscriber with respect to one or more products, wherein any given product has a coverage limit which covers a defined amount of service usage within the validity period.

2. The method of claim 1, wherein the pre-execution time window is defined statically.

3. The method of claim 1, wherein the pre-execution time window is defined at one of a subscription level, a product level or a service level.

4. The method of claim 1, wherein the pre-execution time window is an absolute time value.

5. The method of claim 1, wherein the pre-execution time window is defined dynamically.

6. The method of claim 1, wherein the pre-execution time window is defined based on the subscriber's history of service consumption.

7. The method of claim 6, wherein the adjusted validity period is determined randomly to distribute receipt of subsequent service requests from subscribers within the pre-execution time window.

8. The method of claim 1, wherein the adjusted validity period is determined using an algorithm to evenly distribute receipt of subsequent service requests from subscribers within the pre-execution time window.

9. The method of claim 1, wherein the adjusted validity period is determined using an algorithm to distribute receipt of subsequent service requests from subscribers within a dynamically calculated pre-execution time window based on an amount of requested units for the service quota.

10. A computer program product comprising a non-transitory computer-readable storage medium containing a computer-readable code that when read by processing circuitry causes the processing circuitry to perform a method according to claim 1.

11. A network node configured to facilitate charging usage of a product-related service to a subscriber in a communication network, said network node comprising:
a communication interface configured to receive a service authorization request arising from a service activity by the subscriber; and
a processing circuit operatively associated with the communication interface and configured to: if the service authorization request for the subscriber is received prior to a beginning of a pre-execution time window and if the service authorization request corresponds to a scheduled service recurrence, then adjust a validity period for a granted service quota to ensure that a subsequent service authorization request for the subscriber will be received within the pre-execution time window; and authorize use of the service by the subscriber with respect to one or more products, wherein any given product has a coverage limit which covers a defined amount of service usage within the validity period.

12. The network node of claim 11, wherein the pre-execution time window is defined statically.

13. The network node of claim 11, wherein the pre-execution time window is defined at one of a subscription level, a product level or a service level.

14. The network node of claim 11, wherein the pre-execution time window is an absolute time value.

15. The network node of claim 11, wherein the pre-execution time window is defined dynamically.

16. The network node of claim 11, wherein the pre-execution time window is defined based on the subscriber's history of service consumption.

17. The network node of claim 11, wherein the adjusted validity period is determined randomly to distribute receipt of subsequent service requests from subscribers within the pre-execution time window.

18. The network node of claim 11, wherein the adjusted validity period is determined using an algorithm to evenly distribute receipt of subsequent service requests from subscribers within the pre-execution time window.

19. The network node of claim 11, wherein the adjusted validity period is determined using an algorithm to distribute receipt of subsequent service requests from subscribers within a dynamically calculated pre-execution time window based on an amount of requested units.

20. An apparatus configured to receive a service authorization request arising from a service activity by a subscriber; wherein if the service authorization request for the subscriber is received prior to a beginning of a pre-execution time window and if the service authorization request corresponds to a scheduled service recurrence, then the apparatus is adapted to adjust a validity period for a granted service quota to ensure that a subsequent service authorization request for the subscriber will be received within the pre-execution time window; and to authorize use of the service by the subscriber with respect to one or more products, wherein any given product has a coverage limit which covers a defined amount of service usage within the validity period.

* * * * *